(12) United States Patent
Draeger

(10) Patent No.: US 12,063,922 B1
(45) Date of Patent: Aug. 20, 2024

(54) MOTORIZED TWO-PIECE HEAD FOR OWL WITH INTERNALLY MOUNTED CAMERA

(71) Applicant: Dalen Products, Inc., Knoxville, TN (US)

(72) Inventor: William M. Draeger, Sevierville, TN (US)

(73) Assignee: Dalen Products, Inc., Knoxville, TN (US)

( * ) Notice: Subject to any disclaimer, the term of this patent is extended or adjusted under 35 U.S.C. 154(b) by 152 days.

(21) Appl. No.: 17/968,493

(22) Filed: Oct. 18, 2022

Related U.S. Application Data

(63) Continuation-in-part of application No. 17/685,010, filed on Mar. 2, 2022, now Pat. No. 11,622,553, and a continuation-in-part of application No. 17/126,140, filed on Dec. 18, 2020, now Pat. No. 11,596,141, which is a continuation-in-part of application No. 16/445,714, filed on Jun. 19, 2019, now Pat. No. 11,311,007, said application No. 17/685,010 is a continuation of application No. 16/445,714, filed on Jun. 19, 2019, now Pat. No. 11,311,007.

(51) Int. Cl.
*A01M 29/06* (2011.01)
*F16C 11/04* (2006.01)

(52) U.S. Cl.
CPC ............. *A01M 29/06* (2013.01); *F16C 11/04* (2013.01)

(58) Field of Classification Search
CPC ....... A01M 29/06; A01M 29/16; A01M 29/18
USPC .................................................................. 43/2
See application file for complete search history.

(56) References Cited

U.S. PATENT DOCUMENTS

| | | | |
|---|---|---|---|
| 9,072,288 B1* | 7/2015 | Thomas | A01M 29/10 |
| 9,384,640 B2* | 7/2016 | Shuster | H04M 1/0241 |
| 10,881,096 B1* | 1/2021 | Sweeney | A01M 29/16 |
| 2012/0312248 A1* | 12/2012 | Alves | A01M 29/06 |
| | | | 119/712 |
| 2018/0125058 A1* | 5/2018 | Liu | A01M 29/08 |
| 2020/0037603 A1* | 2/2020 | Felton-Armouti | A01M 29/12 |
| 2020/0323194 A1* | 10/2020 | Li | G01S 13/88 |
| 2021/0251211 A1* | 8/2021 | Rashed | A01M 29/16 |

* cited by examiner

*Primary Examiner* — Joshua J Michener
*Assistant Examiner* — Nicole Paige MacCrate
(74) *Attorney, Agent, or Firm* — Luedeka Neely, P.C.

(57) ABSTRACT

A scarecrow includes a scarecrow body corresponding generally in shape to a body of a live animal; an assembled hollow scarecrow head of molded plastic construction corresponding in shape to a head of the live animal, the assembled head having a front face portion and a separate rear head portion fixed together to form the head, the front face portion having an aperture at an eye location of the front face portion; a camera having a lens configured as an eye and located at the eye location to appear as an eye of the scarecrow; a motion sensor associated with the camera to sense motion proximate the scarecrow; and a motor assembly mounted to the scarecrow body and the head and configured to move the head in multiple axis.

7 Claims, 12 Drawing Sheets

MOTORIZED TWO-PIECE HEAD FOR OWL WITH INTERNALLY MOUNTED CAMERA

FIELD

This disclosure relates to the field of scarecrows and particularly plastic owls having movable heads. More particularly, the disclosure relates to a motorized two-piece head having an internally mounted camera and configured to follow motion in multiple axis.

BACKGROUND

Improvement is desired in the structure and assembly of scarecrow devices and the like of the type having a head that moves relative to a body under motorized movement in multiple axis of movement. It is also desired to provide a scarecrow that has an internal camera that can sense motion of a person/animal proximate the scarecrow and activate the camera to capture images of the person/animal that is moving.

The present disclosure advantageously provides improved scarecrow structures for incorporating a camera into a motorized head which simplify assembly and result in other product improvements.

In one embodiment, a scarecrow owl is provided having a motorized head that senses motion proximate the scarecrow. When such motion is sensed, the camera is activated and a motor assembly is operated to enable movement of the head in more than one axis so as to have multiple axis of motion to enable the camera to follow the movement of the moving object.

SUMMARY

The above and other needs are met by a scarecrow having a motorized movable head with an internal camera.

In one aspect, a scarecrow according to the disclosure includes a scarecrow body corresponding generally in shape to a body of a live animal; an assembled hollow scarecrow head of molded plastic construction corresponding in shape to a head of the live animal, the assembled head having a front face portion and a separate rear head portion fixed together to form the head, the front face portion having an aperture at an eye location of the front face portion; a camera having a lens configured as an eye and located at the eye location to appear as an eye of the scarecrow; a motion sensor associated with the camera to sense motion proximate the scarecrow; and a motor assembly mounted to the scarecrow body and the head and configured to move the head in multiple axis.

The motor assembly has a swivel motor having a rotatable motor shaft, the swivel motor being received in a swivel motor bracket mounted to an upper surface of the scarecrow body, with a swivel motor bracket cover overlying the swivel motor bracket and including an aperture for passage of the rotatable motor shaft of the swivel motor, a tilt motor having a rotatable motor shaft and received by a tilt motor bracket, with a tilt motor bracket cover, the tilt motor cover having an upstanding portion adjacent the tilt motor bracket and a base portion overlying the swivel motor bracket cover, the upstanding portion having an aperture for passage of the rotatable motor shaft of the tilt motor and the base portion having a slot to receive the rotatable motor shaft of the swivel motor such that the tilt motor cover rotates in response to rotation of the rotatable motor shaft of the swivel motor, and a head connector bracket overlying the upstanding portion and having a slot located to overlie the aperture of the upstanding portion and receive the rotatable motor shaft of the tilt motor such that the head connector bracket rotates relative to the upstanding portion in response to rotation of the rotatable motor shaft of the tilt motor, the head connector bracket also having a curved mount located at an upper edge thereof and connected to an underside of the rear head portion.

An electronic controller is mounted within the head and in electrical communication with the swivel motor, the tilt motor, the camera, and the motion sensor. In response to motion exterior of the scarecrow being sensed by the motion sensor the electronic controller activates the camera and operates the swivel motor or tilt motor or both as needed to swivel or tilt or both the head so that the head moves and the camera follows the motion and records images of the motion.

In another aspect, a scarecrow according to the disclosure includes a scarecrow body corresponding generally in shape to a body of a live animal; a scarecrow head corresponding in shape to a head of the live animal; a camera having a lens configured as an eye and located at the eye location to appear as an eye of the scarecrow; a motion sensor associated with the camera to sense motion proximate the scarecrow; and a motor assembly mounted to the scarecrow body and the head and configured to move the head in multiple axis.

The motor assembly includes a swivel motor having a rotatable motor shaft, the swivel motor being received in a swivel motor bracket mounted to an upper surface of the scarecrow body, with a swivel motor bracket cover overlying the swivel motor bracket and including an aperture for passage of the rotatable motor shaft of the swivel motor, a tilt motor having a rotatable motor shaft and received by a tilt motor bracket, with a tilt motor bracket cover, the tilt motor cover having an upstanding portion adjacent the tilt motor bracket and a base portion overlying the swivel motor bracket cover, the upstanding portion having an aperture for passage of the rotatable motor shaft of the tilt motor and the base portion having a slot to receive the rotatable motor shaft of the swivel motor such that the tilt motor cover rotates in response to rotation of the rotatable motor shaft of the swivel motor, a head connector bracket overlying the upstanding portion and having a slot located to overlie the aperture of the upstanding portion and receive the rotatable motor shaft of the tilt motor such that the head connector bracket rotates relative to the upstanding portion in response to rotation of the rotatable motor shaft of the tilt motor, the head connector bracket being connected to an underside of the rear head portion.

An electronic controller is mounted within the head and in electrical communication with the swivel motor, the tilt motor, the camera, and the motion sensor. In response to motion exterior of the scarecrow being sensed by the motion sensor the electronic controller activates the camera and operates the swivel motor or tilt motor or both as needed to swivel or tilt or both the head so that the head moves and the camera follows the motion and records images of the motion.

In a further aspect, the disclosure provides a motion following camera, having a head; a camera mounted on the head; a motion sensor associated with the camera to sense motion proximate the head; and a motor assembly mounted to a support proximate the head and configured to move the head in multiple axis relative to the support.

The motor assembly has a swivel motor having a rotatable motor shaft, the swivel motor being received in a swivel motor bracket mounted to the support, with a swivel motor bracket cover overlying the swivel motor bracket and including an aperture for passage of the rotatable motor shaft of the swivel motor; a tilt motor having a rotatable motor shaft and received by a tilt motor bracket, with a tilt motor bracket cover, the tilt motor cover having an upstanding portion adjacent the tilt motor bracket and a base portion overlying the swivel motor bracket cover, the upstanding portion having an aperture for passage of the rotatable motor shaft of the tilt motor and the base portion having a slot to receive the rotatable motor shaft of the swivel motor such that the tilt motor cover rotates in response to rotation of the rotatable motor shaft of the swivel motor; and a head connector bracket overlying the upstanding portion and having a slot located to overlie the aperture of the upstanding portion and receive the rotatable motor shaft of the tilt motor such that the head connector bracket rotates relative to the upstanding portion in response to rotation of the rotatable motor shaft of the tilt motor, the head connector bracket being connected to an underside of the head.

An electronic controller is mounted within the head and in electrical communication with the swivel motor, the tilt motor, the camera, and the motion sensor. In response to motion exterior of the scarecrow being sensed by the motion sensor the electronic controller activates the camera and operates the swivel motor or tilt motor or both as needed to swivel or tilt or both the head so that the head moves and the camera follows the motion and records images of the motion.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
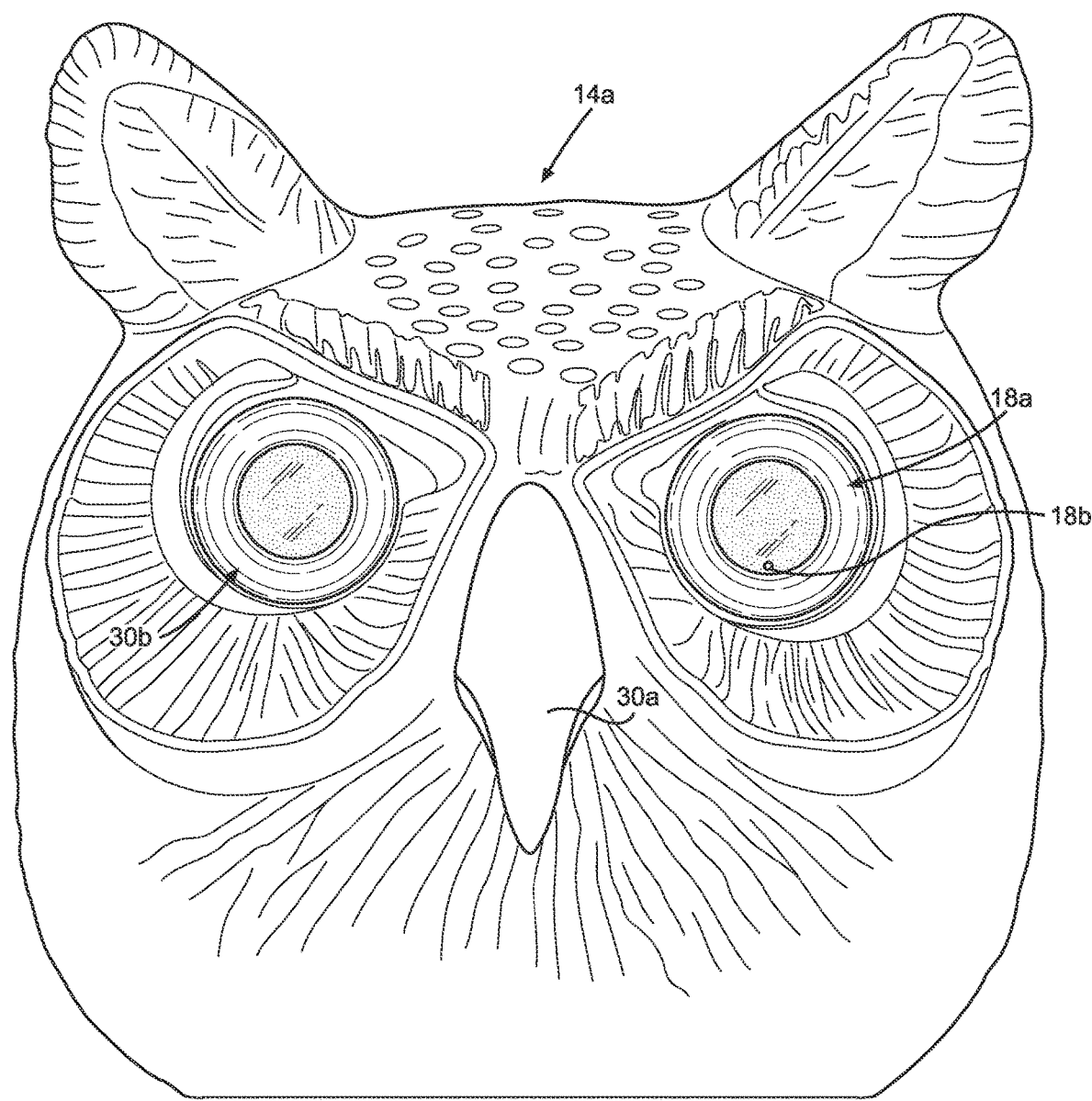
FIG. 1 is a frontal view of a motorized two-piece head with an internally mounted camera according to the disclosure.
Figure 2:
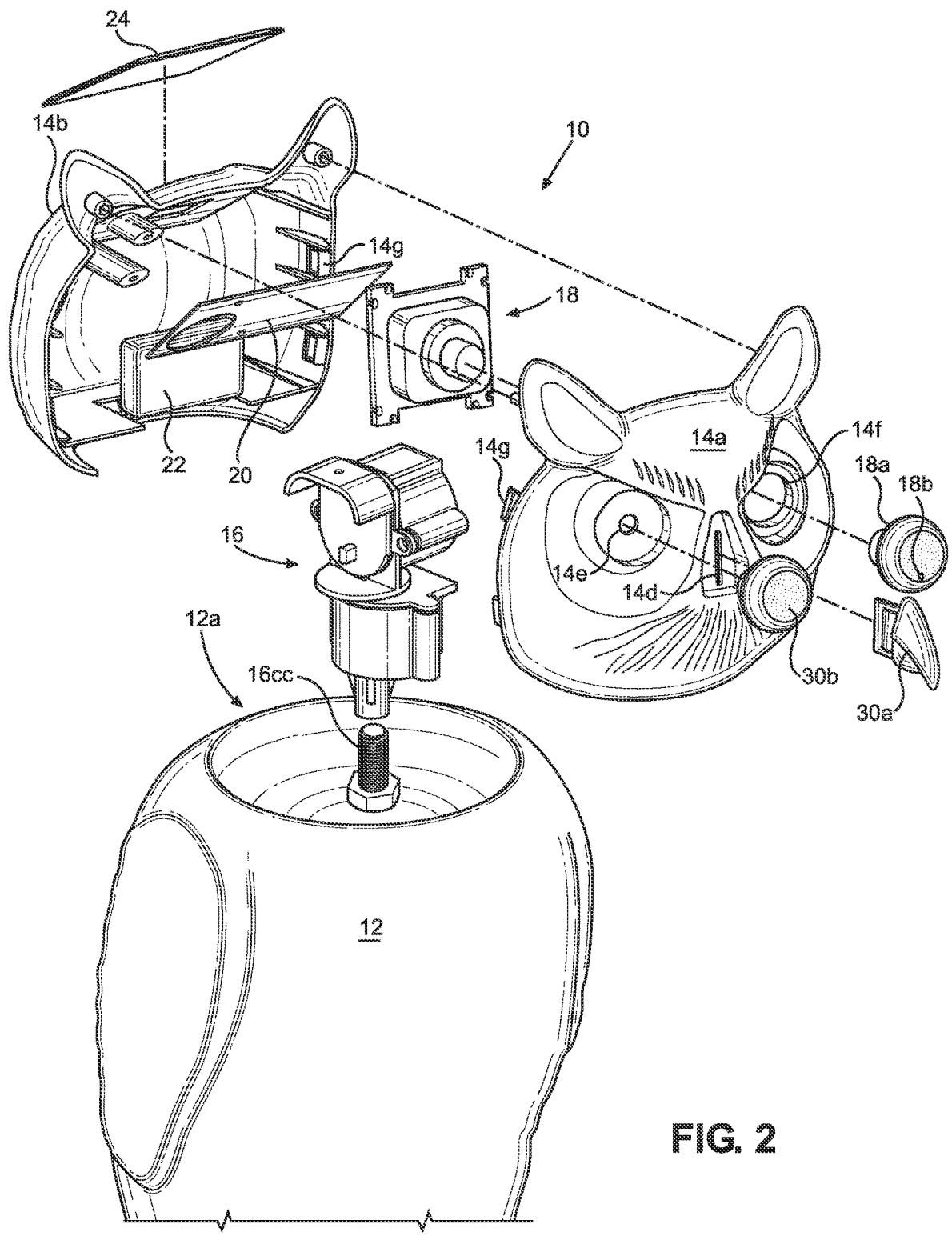
FIG. 2 is an exploded perspective view of a motorized two-piece head with an internally mounted camera according to the disclosure.
Figure 3:
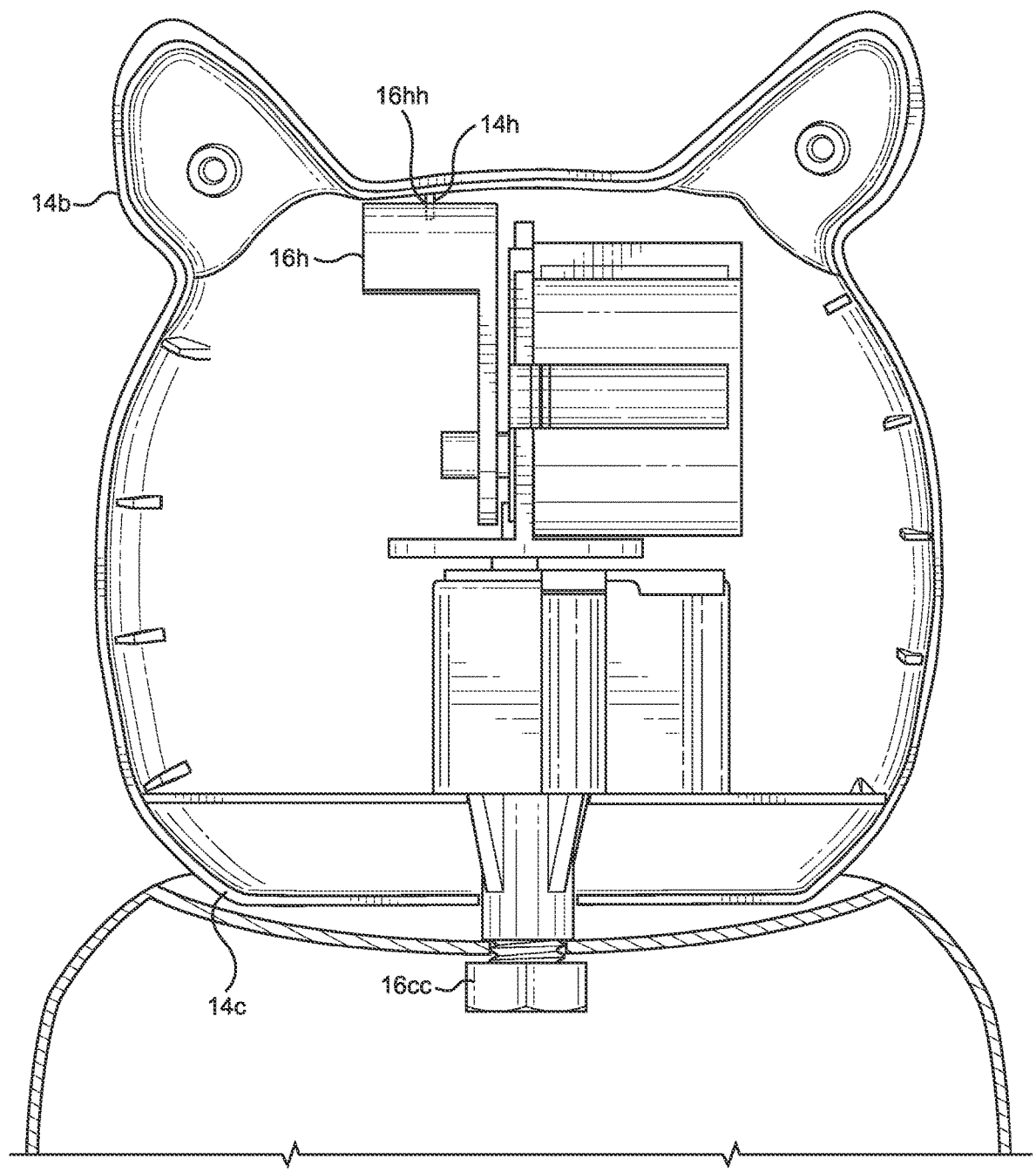
FIG. 3 is a closeup view showing installation of motor and camera components of the head onto a rear head portion.
Figure 4:
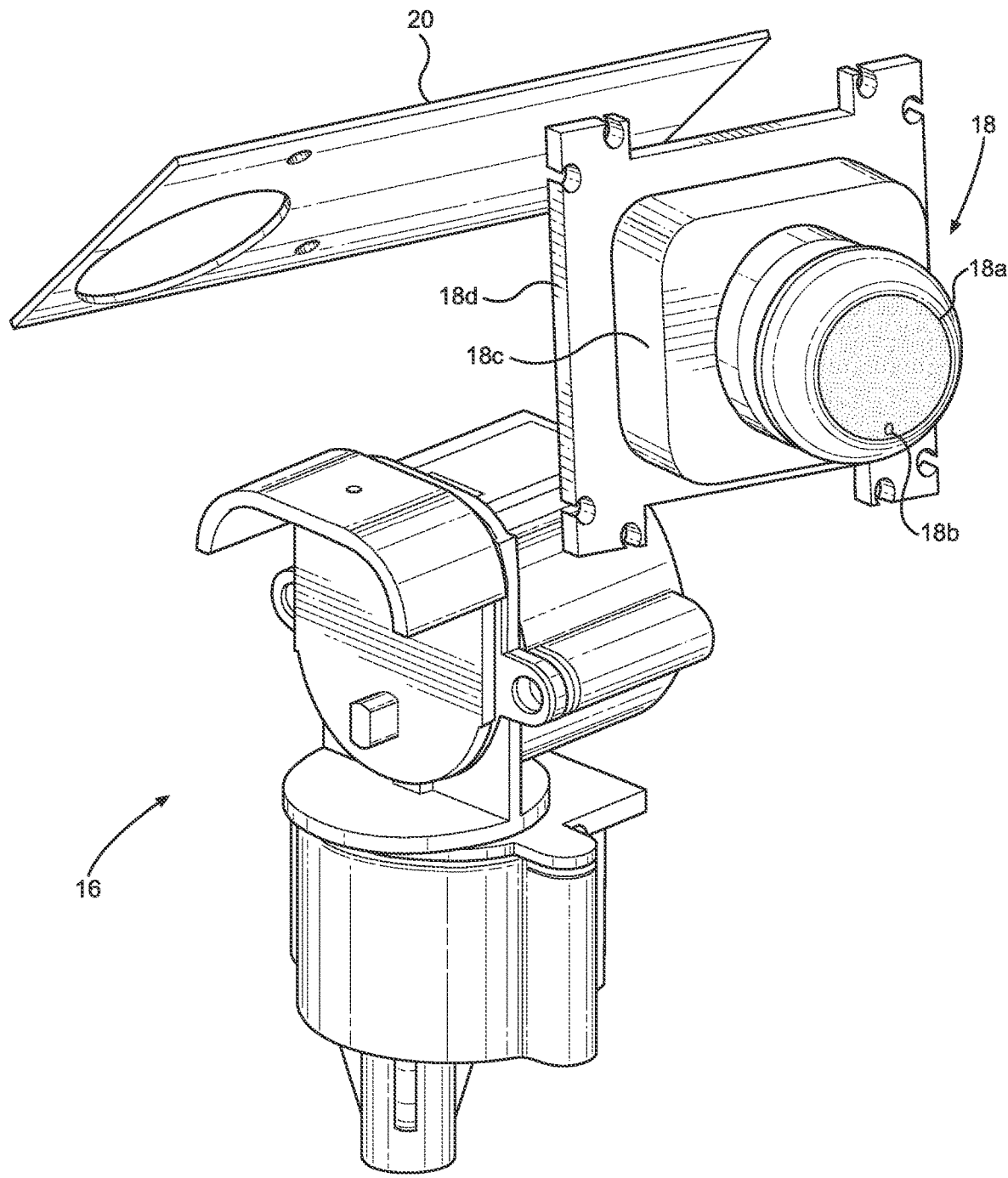
FIGS. 4 and 5 are views of the motor and camera components.
Figure 5:
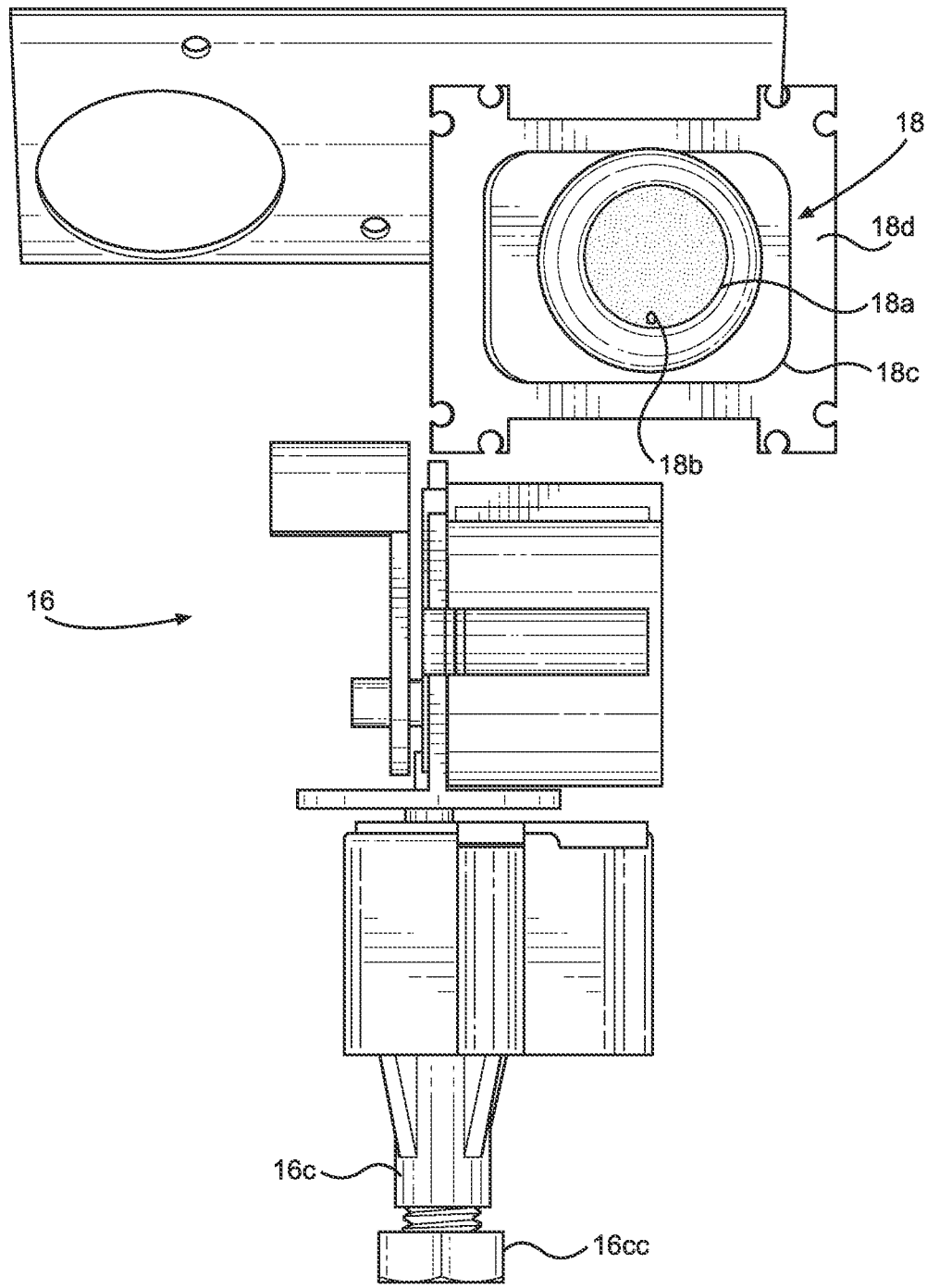
Figure 6:
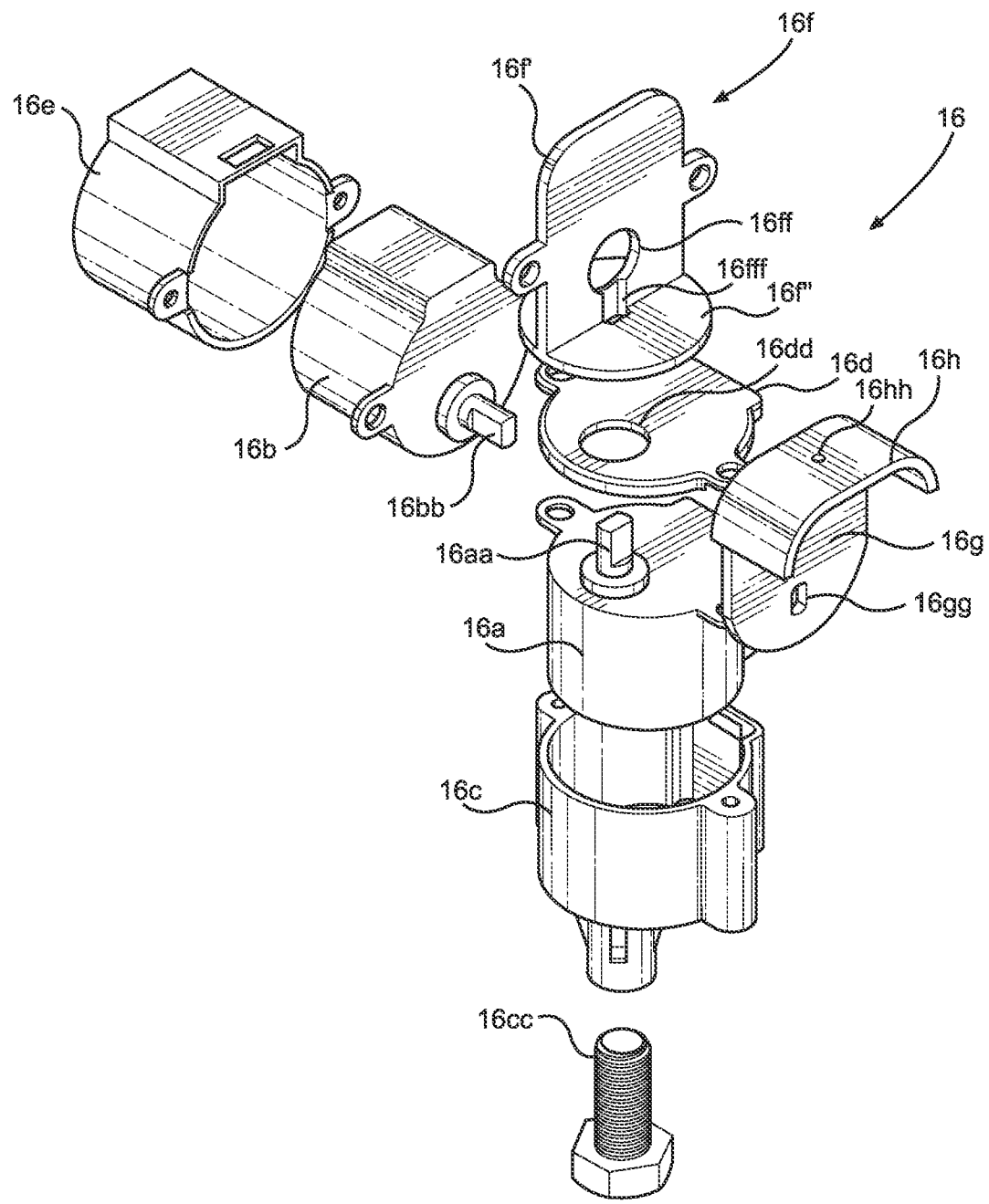
FIG. 6 is an exploded view of motor components.
Figure 7:
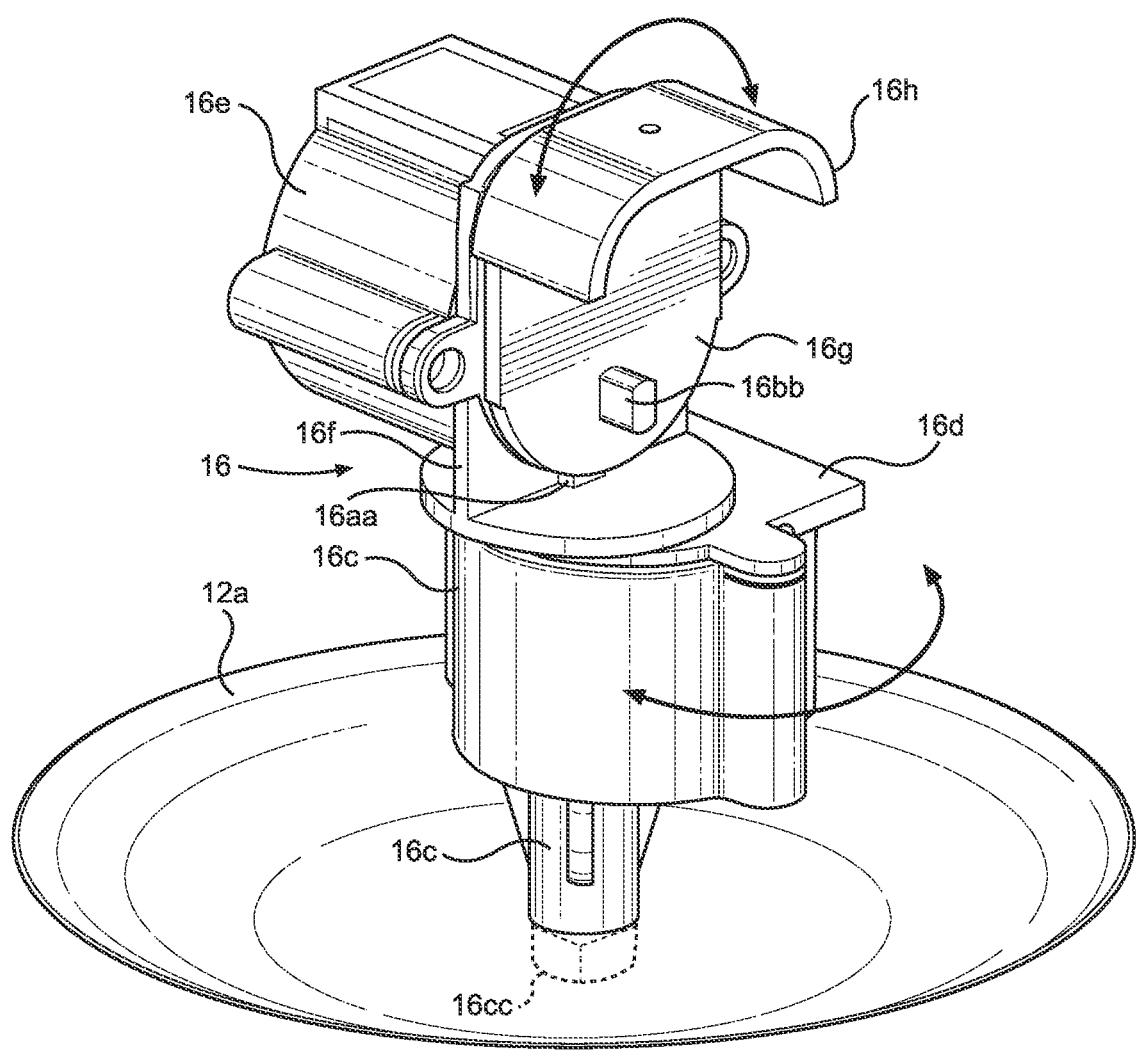
FIGS. 7 and 8 show the motor components connected to a scarecrow body.
Figure 8:
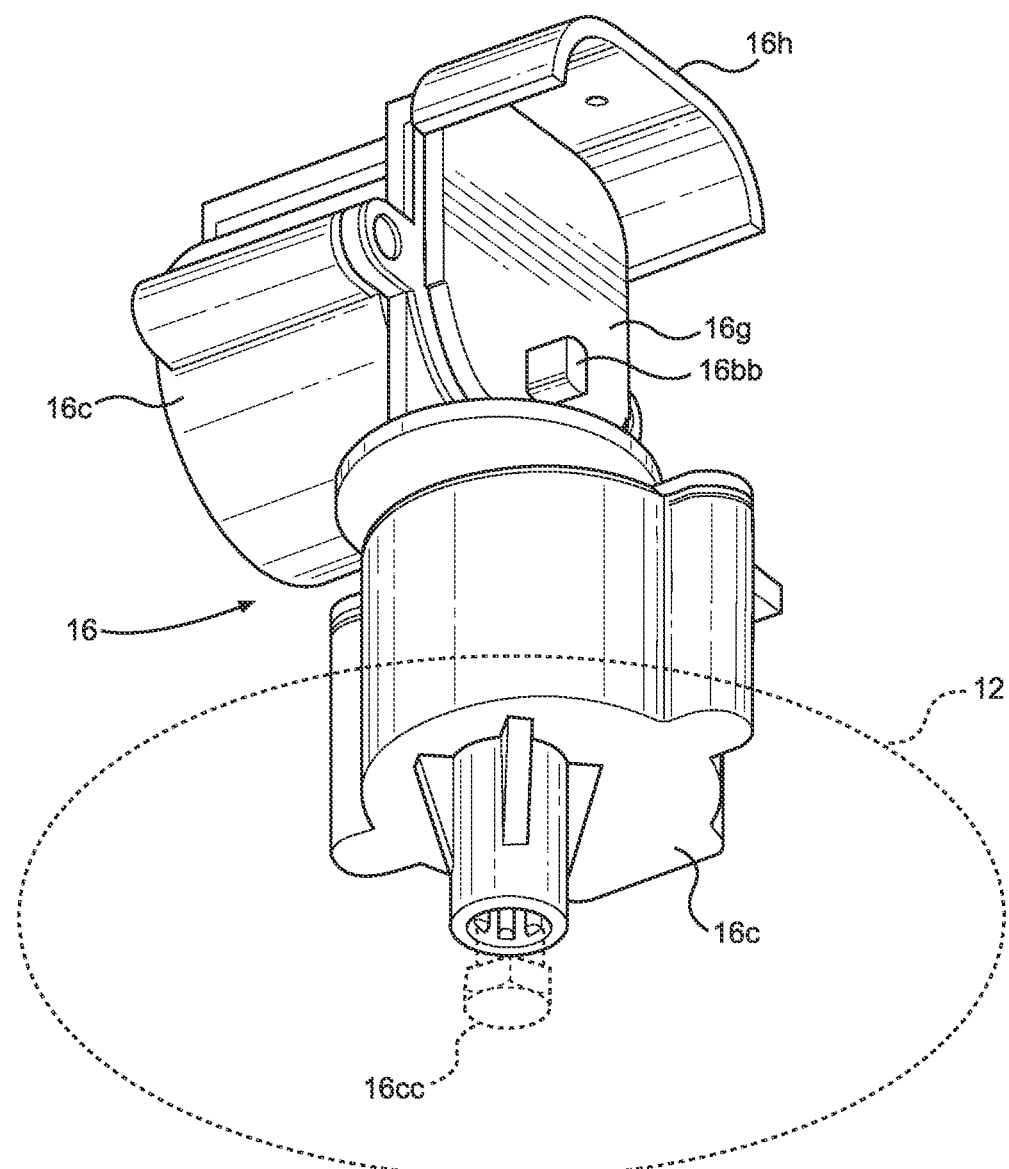

With initial reference to FIGS. 1 and 2, there is shown a scarecrow 10 having a scarecrow body 12 and a head 14 mounted for motorized movement relative to the body 12. The head 14 includes a motor assembly 16 and a camera 18 having a lens 18*a* configured as an eye of the scarecrow. A motion sensor 18*b* associated with the camera 18 is integrated with the lens 18*a*. An electronic controller 20 is in electronic communication with the motor assembly 16, the camera 18 and the motion sensor 18*b*.

The electronic controller 20 utilizes information from the motion sensor 18*b* to control operation of the camera 18 to record images and to control operation of the motor assembly 16. The motor assembly 16 is configured to enable motion in multiple axis. The motor assembly 16 moves the head 14 relative to the body 12, which moves the camera 18 to follow the motion and record images of the motion.

The scarecrow 10 is configured as a great-horned owl, but it will be appreciated that scarecrows according to the disclosure may be configured as other birds and other animals, preferably predator animals such as hawks or cats. However, the head 14 and the body 12 may be otherwise configured in ornamentation if desired for novelty or entertainment purposes to provide a moving housing or head for supporting the camera 18 and housing the motor assembly 16.

The body 12 corresponds to the body of the owl replicas described in U.S. Pat. No. 5,901,491, entitled "Owl With Movable Head," issued May 11, 1999, U.S. Pat. No. 7,966,963, entitled "Owl With Intermittent Powered Movement," issued Jun. 28, 2011, and U.S. Pat. No. 8,171,875, entitled "Owl With Intermittent Powered Movement," issued May 8, 2012, each incorporated by reference herein in its entirety. In this regard, the body 12 externally resembles the shape and appearance of the body of a live owl. The body 12 includes a concave upper surface 12*a* to receive a lower portion of the head 14 so that the head 14 is countersunk into the body 12 to enhance the realistic appearance of the replica and to avoid diminishment of this appearance during movement of the head 14.

The head 14 is provided by a front face portion 14*a* and a rear head portion 14*b* that assemble and matingly engage one another to provide the head 14. The head 14 in the assembled state corresponds externally in shape to the head of a live owl. The assembled head 14 is generally hollow and globe shaped. The assembled head 14 has an aperture 14*c* adjacent the lower portion of the head 14. A plastic mouth or beak 30*a* is installed into receiver 14*d* and a plastic eye 30*b* is installed into receiver 14*e* on the front face portion 14*a*. An aperture 14*f* is located on the front face portion 14*a* at the eye location opposite the receiver 14*d* for location of the camera 18, as explained more fully below.

The front face portion 14*a* advantageously provides a structure that has a flattened profile and this profile facilitates automated insertion of the beak 30*a* and eye 30*b*. The automated insertion of beak 30*a* and eye 30*b* is difficult with a one-piece head and is generally done by hand. It will be appreciated that the beak 30*a* and the eye 30*b* may be formed with the front face portion 14*a* during molding, but the realistic appearance of a separately molded mouth/beak and eye is desirable.

The front face portion 14*a* and the rear head portion 14*b* have cooperating snap or press fit connectors 14*g* that matingly engage one another in press or snap fit relationships to facilitate tool-less assembly of the head 14. One advantage of the two-piece molded head design includes a significant reduction in the labor and ease of installation of the motor assembly 16, the camera 18, the electronic controller 20 and battery.

The motor assembly 16 is installed inside the head 14 and supported by the scarecrow body 12 to enable motorized movement of the head 14 in a desired manner relative to the body 12. As shown in FIGS. 9A-9C and 10A-10C the motor assembly 16 is configured to enable movement of the head 14 in 360 degrees rotation and up and down tilting of the head 14. The rotational and tilting movements may occur at the same time so as to enable the head 14 to follow motion.

Thus, the motor assembly 16 is configured to enable movement of the head 14 in more than one axis to have multiple axis of motion to enable the camera 18 to follow the movement of the moving object. As will be noted, the motor assembly 16 operates to move the head 14 in multiple axis relative to the body 12 so that the head 14 can pan and tilt and move the head 14 to enable the camera 18 to follow and record a moving object, such as shown in FIGS. 11A-12D.

The motor assembly includes a swivel motor 16a having a rotating output shaft 16aa and a tilt motor 16b having a rotating output shaft 16bb. The swivel motor 16a provides rotational movement to the head 14 and the tilt motor 16b provides up/down tilting motion of the head 14. The output shaft 16aa provides 360 degrees of rotation. The output shaft 16bb provides about 45 degrees of rotation in one direction and about 45 degrees of rotation in the other direction.

Figure 10A:
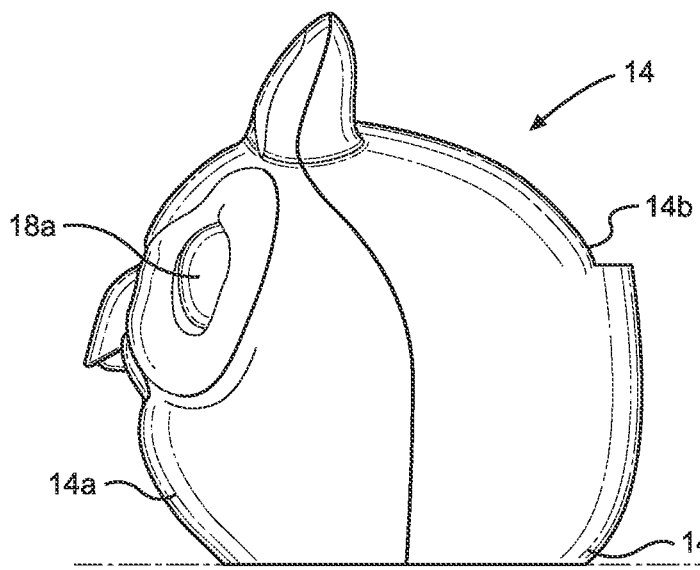
FIGS. 10A-10C depict vertical or nodding movements of the head.

The motors 16a and 16b are preferably each direct current motors and are controlled by the electronic circuit 20. The electronic circuit 20 is connected to the motors 16a and 16b as by wires. The electronic circuit 20 and the motors 16a and 16b are powered as by a battery 22. The battery 22 is charged as by a solar panel 24 that may be mounted on the head 14 (FIG. 10A).

The swivel motor 16a is received by a bracket 16c configured as a pedestal to cooperate with and mount to the concave upper surface 12a of the body 12 as by a threaded fastener 16cc. A cover 16d overlies the bracket 16c and includes an aperture 16dd for passage of the output shaft 16aa.

The tilt motor 16b is received by a bracket 16e. A cover 16f is configured to have an upstanding portion 16f' to cover the open end of the bracket 16e and a base portion 16f'' to overlie the cover 16d. The cover 16f includes an aperture 16ff for passage of the output shaft 16bb of the motor 16a and a slot 16fff through the base portion 16f'' of the cover 16f to receive the output shaft 16aa of the motor 16a. Thus, the cover 16f rotates in response to rotation of the output shaft 16aa.

A head connector bracket 16g is configured to overlie the upstanding portion 16f' of the cover 16f. The head connector bracket 16g includes a slot 16gg located to overlie the aperture 16dd and configured to receive the output shaft 16bb of the tilt motor 16b. Thus, the head connector bracket 16g will rotate relative to the upstanding portion 16f' of the cover 16f when the output shaft 16bb rotates to provide the desired up and down tilt motion. A curved mount 16h is located at an upper edge of the bracket 16g to mount to an underside of the rear head portion 14b.

The mount 16h is fixed to the underside of the rear head portion 14b as shown. This fixation may be accomplished by various manners, such as by use of a fastener or screw, sonic welding, adhesive or the like, or friction fit into a corresponding receiver on the rear head portion 14b. As shown, a fastener in the form of a peg 14h formed with the rear head portion 14b extends downwardly from the inner surface of the rear head portion 14b and is inserted to friction fit through a corresponding aperture 16hh of the mount 16h. Alternatively, the curved mount 16h may be molded as part of the rear head portion 14b and then assembled onto the head assembly 16. The two-piece construction of the head 16 enables many different options for connection of the mount 16h and the rear head portion 14b.

Figure 9A:
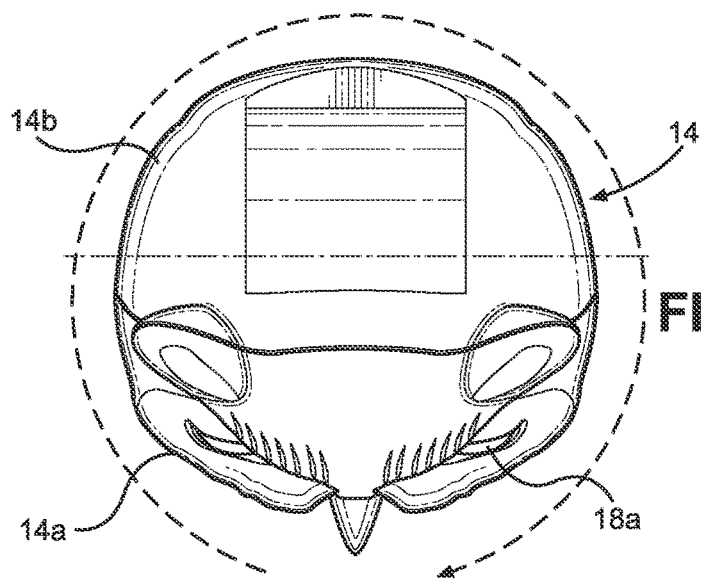
FIGS. 9A-9C depict rotational or lateral movements of the head.
Figure 9B:
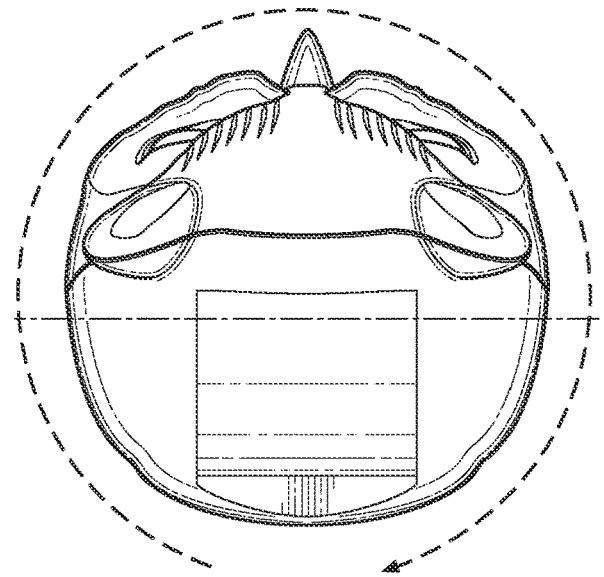
Figure 9C:
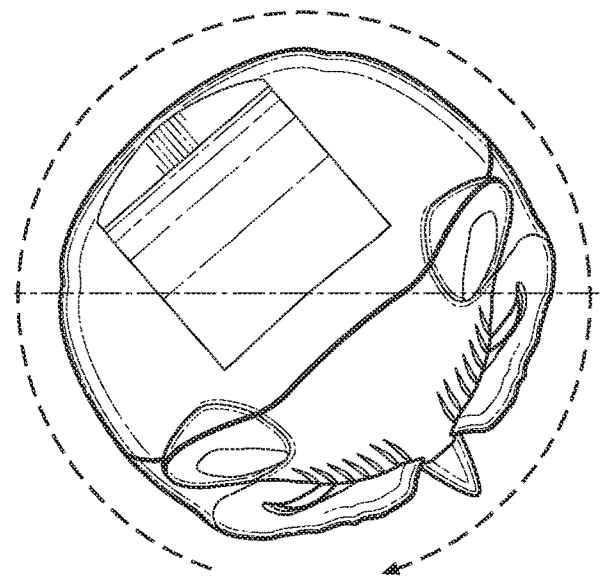

Because the motor 16a is fixed to the bracket 16c, which is fixed relative to the head 14, operation of the motor 16a serves to rotate the head 14 relative to the body 12, as depicted in FIGS. 9A-9C. The base portion of the bracket 16f is fixed to the output shaft 16aa and thus the bracket 16f rotates with the output shaft 16aa of the motor 16a. The motor 16b also rotates with the bracket 16f. The output shaft 16aa is operated to have 360 degrees of rotation and may go clockwise or counterclockwise and switch between the two directions. Thus, the head 14 can have a continuous rotation or a back-and-forth rotation.

Figure 10B:
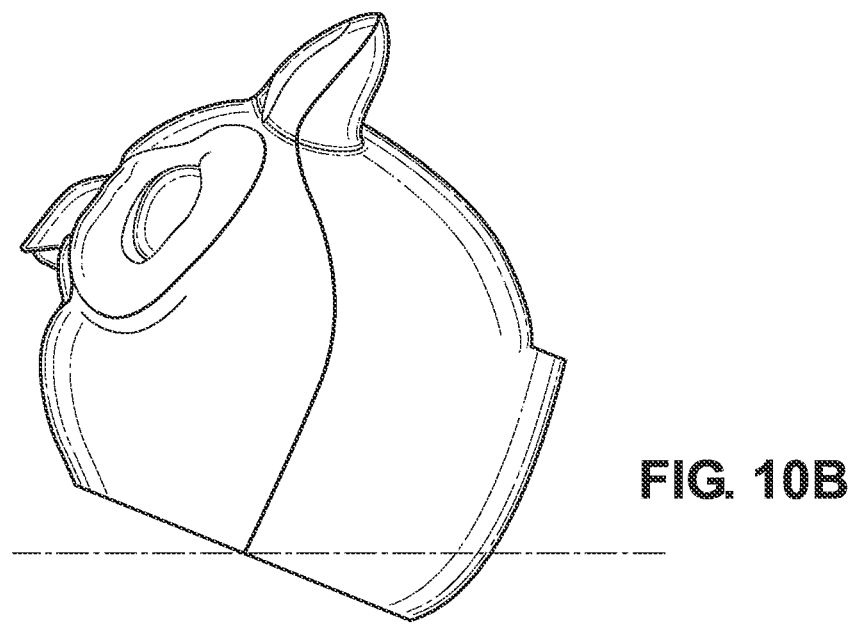
Figure 10C:
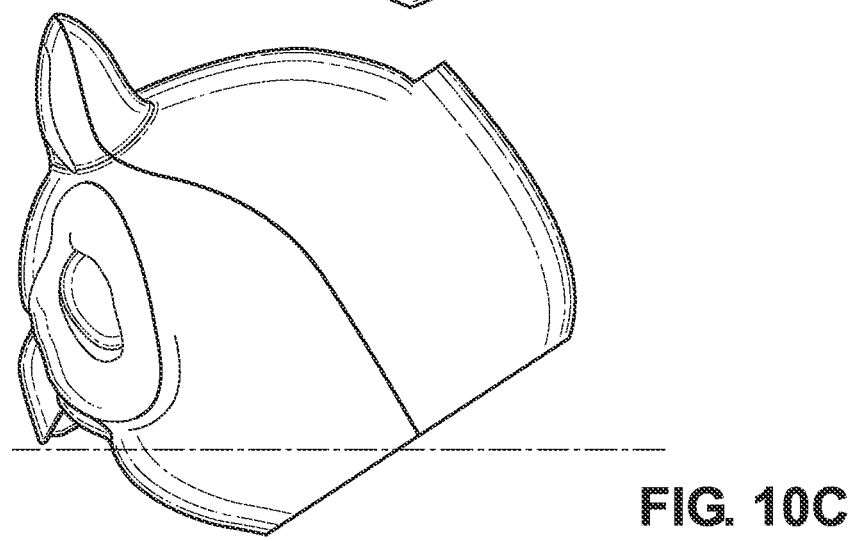
Figure 11C:
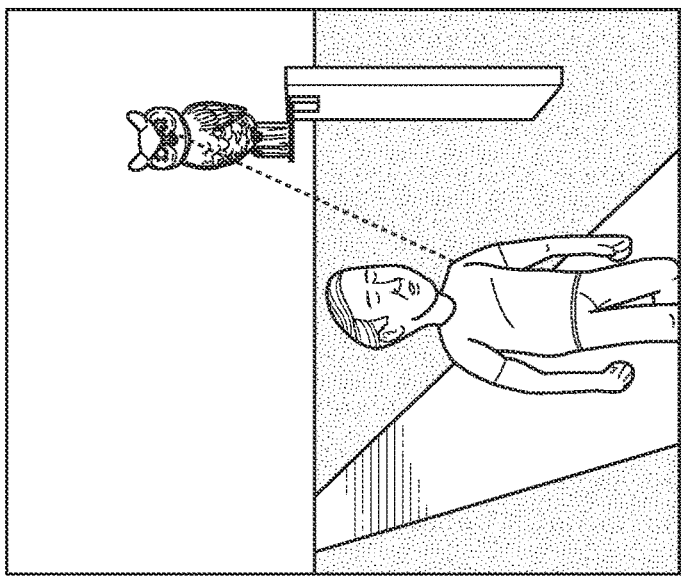
FIGS. 11A-11C depict the head capturing images of a person and following the person.
Figure 11B:
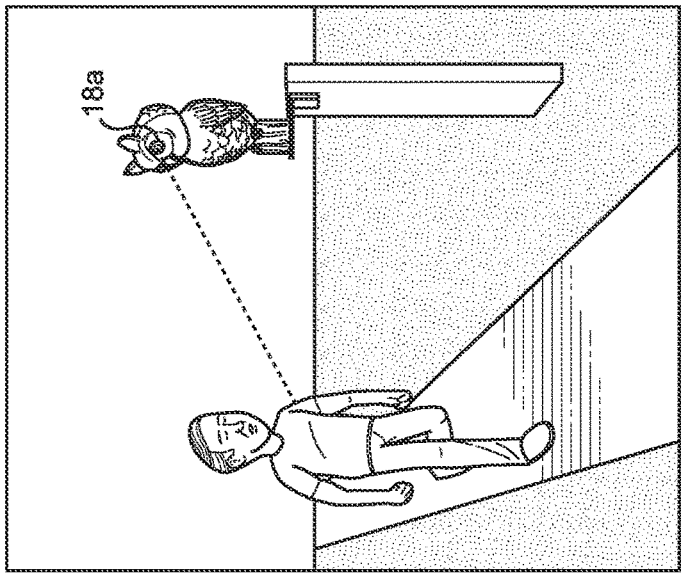
Figure 11A:
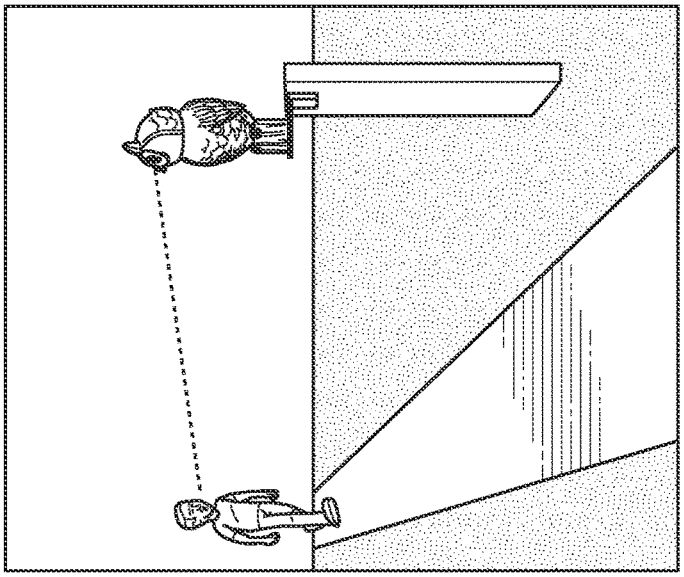
Figure 12A:
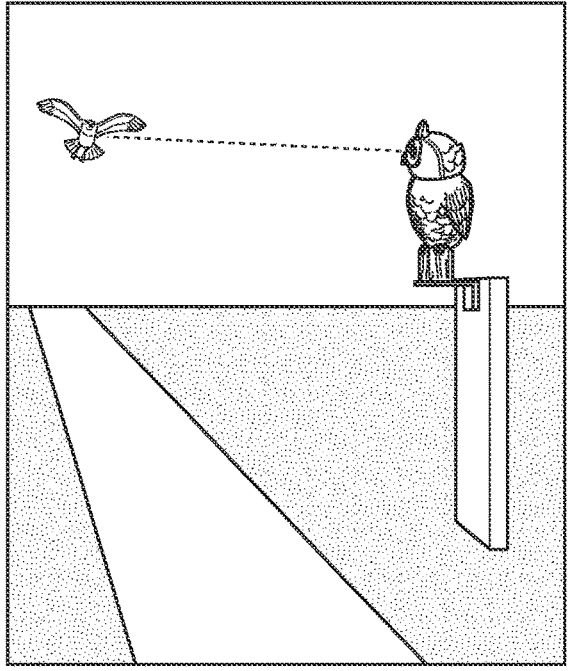
FIGS. 12A-12D depict the head capturing images of an animal and following the animal.
Figure 12B:
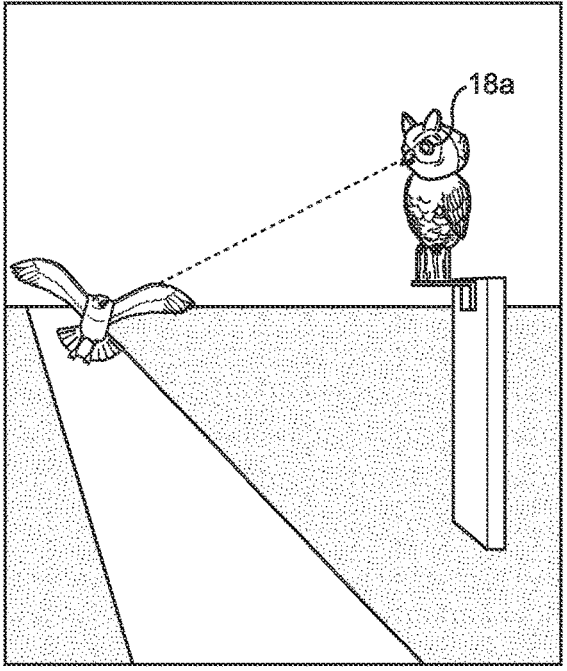
Figure 12C:
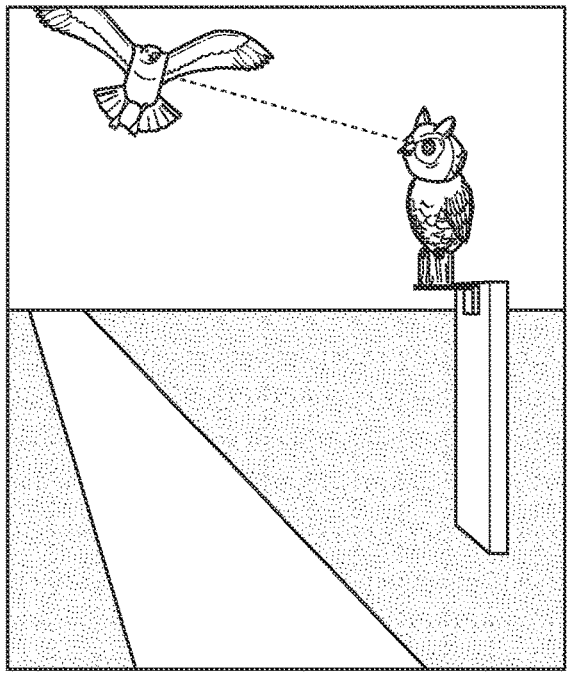
Figure 12D:
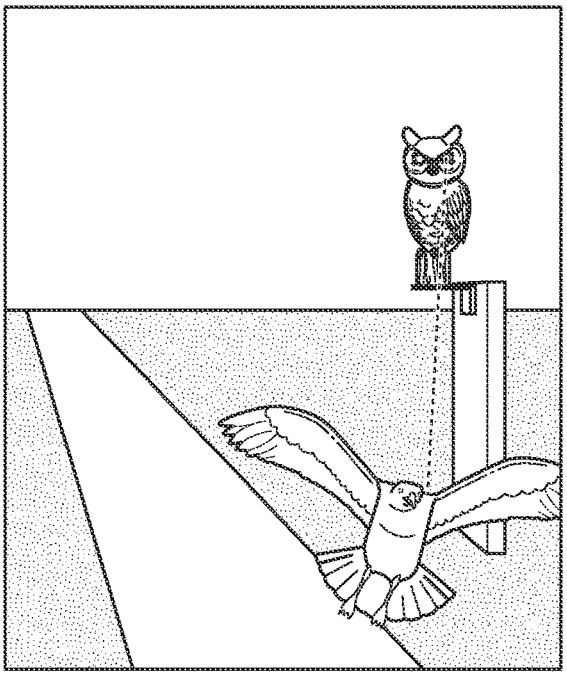

The bracket 16g is fixed to the output shaft 16bb of the motor 16b and thus moves according to the movement of the output shaft 16bb. As noted, the output shaft 16bb is operated to rotate about 45 degrees in each direction, going back and forth. The movement of the bracket 16g provides movement of the curved mount 16h, which is attached to the underside of the head 14. This results in the up and down tilting of the head 14 due to rotation of the output shaft 16bb, which tilting is depicted in FIGS. 10A-10C.

The camera 18 is desirably a 1080-pixel weatherproof camera capable of selectively taking still or video color or black and white images based on the selection of the user in day or night light conditions. If desired a flash, such as an invisible black flash that is not visible and is small and discrete, may be incorporated on the head 14 to operate at night when the camera 18 is activated.

The camera 18 includes a camera body 18c from which the lens 18a extends. The camera body 18c is secured to a camera mount 18d which is secured to the interior of the head 14 to mount the camera 18 within the head 14. The camera 18 is mounted such that the lens 18a is positioned within the aperture 14f located on the front face portion 14a at the eye location opposite the receiver 14d which is fitted with the plastic eye 30b. Thus, as the lens 18a is configured as an eye, the lens 18a and the plastic eye 30b together appear as the eyes of the scarecrow 10. The lens 18a faces outwardly in the manner of an eye to be able to view objects as shown.

The electronic controller 20 and the battery 22 are desirably mounted within the rear head portion 14b, with interior surfaces of the rear head portion 14b configured to receive the controller 20 and the battery 22. It will be appreciated that the two-piece construction of the head 14 greatly simplifies installation of the electronic circuit 18 and the battery 22 into the head 14. The two-piece construction of the head 14 also facilitates replacement of the battery 22, the controller 20, the motors 16a and 16b or other components if repair or replacement is needed.

The electronic controller 20 and the motion sensor 18b are operative to activate the motor 16a and/or the motor 16b when motion is sensed by the motion sensor 10b. For example, should a person, bird, rabbit or the like be proximate and moving near the scarecrow 10 (e.g., within 5 feet), the motion sensor 18b will sense this motion and send a signal to the electronic controller 20. In response, the controller 20 will supply power to operate the motor 16a or the motor 16b or both and the camera 18 to move the head 14 as needed so that the camera 18 can follow and record the motion for as long as the motion is sensed. Once the moving object, is out of range of the motion sensor 18b, the motion of the head 14 and the recording by the camera 14 ceases. Desirably, at this point, the controller 20 will operate the motors 16a and 16b to return the head 14 to a forward facing and level orientation. Examples of movement of the head 14 when activated by motion of an object are seen in FIGS. 11A-11D and 12A-12D.

The electronic controller 20 is configured as a programmable circuit board to enable a variety of desired functions.

For example, the controller 20 may be wirelessly connected to a smartphone or tablet or the like computer device to enable the images taken by the camera 18 to be viewed. Images/recordings may be stored remotely on the cloud if desired and internet service is available and utilized. Preferably an internet connection is utilized for communication between the controller 20 and a smartphone or tablet or the like computer device.

The controller 20 may also include a microphone and a speaker to enable sounds to be recorded and broadcast from the scarecrow 10. For example, the controller 20 may be programmed so that sounds proximate the scarecrow 10 are automatically recorded when the motion sensor 18b senses motion and/or sound. The motion sensor 18b may also be configured to detect and be triggered by sound waves to record images and audio when sounds are detected even in the absence of motion. Desirably, an alert is generated and sent to the computer device when the motion sensor 18b detects motion and/or sound. A user can also operate the scarecrow 10 to enable the user to record audio to be broadcast when the sensor 18b is activated, or to respond with live audio when the sensor 18b is activated.

For example, a user may record audio such as the screeching of an owl or audio such as speaking "I see you." This recorded audio would be played while the sensor 18b remains activated. Alternatively, the audio may be spontaneous or live from the user via the computer device. For example, when the sensor 18b is activated and the user receives an alert and views the images from the camera 18, the user may choose to audibly respond. In one example of this, the scarecrow 10 might be proximate a garden and the user has a dog that likes to dig in the garden. When the sensor 18b is triggered by barking of the dog or motion of the dog proximate the garden, the user will hear the barking and/or see the dog proximate the garden. The user may then speak to the dog via the speaker on the scarecrow 10 and say the dog's name and say a command to the dog, such as "No" to try and deter the dog from going into the garden.

Accordingly, it will be appreciated that the disclosure provides a scarecrow having a motorized head and a camera. The scarecrow is configured to sense motion and sounds proximate the scarecrow and has an electronic controller configured to control operation of motorized movement of the head and operation of the camera, and data storage for saving sounds and images. When such motion or sound is sensed, the scarecrow functions so that the head moves the head to follow the motion and/or sound and images and sounds are recorded, and other live or recorded audible interaction may occur if desired. Thus, it will be understood that motion corresponds to motion of something exterior of the scarecrow such as a person, an animal or other physical object moving relative to the scarecrow as depicted, and that the head moves so that the camera remains aligned with or facing the motion, that is, the moving object.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A scarecrow, comprising:
a scarecrow body corresponding generally in shape to a body of a live animal;
an assembled hollow scarecrow head of molded plastic construction corresponding in shape to a head of the live animal, the assembled head comprising a front face portion and a separate rear head portion fixed together to form the head, the front face portion having an aperture at an eye location of the front face portion;
a camera having a lens configured as an eye and located at the eye location to appear as an eye of the scarecrow;
a motion sensor associated with the camera to sense motion proximate the scarecrow;
a motor assembly mounted to the scarecrow body and the head and configured to move the head in multiple axis, the motor assembly having:
a swivel motor having a rotatable motor shaft, the swivel motor being received in a swivel motor bracket mounted to an upper surface of the scarecrow body, with a swivel motor bracket cover overlying the swivel motor bracket and including an aperture for passage of the rotatable motor shaft of the swivel motor,
a tilt motor having a rotatable motor shaft and received by a tilt motor bracket, with a tilt motor bracket cover, the tilt motor cover having an upstanding portion adjacent the tilt motor bracket and a base portion overlying the swivel motor bracket cover, the upstanding portion having an aperture for passage of the rotatable motor shaft of the tilt motor and the base portion having a slot to receive the rotatable motor shaft of the swivel motor such that the tilt motor cover rotates in response to rotation of the rotatable motor shaft of the swivel motor, and
a head connector bracket overlying the upstanding portion and having a slot located to overlie the aperture of the upstanding portion and receive the rotatable motor shaft of the tilt motor such that the head connector bracket rotates relative to the upstanding portion in response to rotation of the rotatable motor shaft of the tilt motor, the head connector bracket also having a curved mount located at an upper edge thereof and connected to an underside of the rear head portion; and
an electronic controller mounted within the head and in electrical communication with the swivel motor, the tilt motor, the camera, and the motion sensor;
wherein in response to motion exterior of the scarecrow being sensed by the motion sensor the electronic controller activates the camera and operates the swivel motor or tilt motor or both as needed to swivel or tilt or both the head so that the head moves and the camera follows the motion and records images of the motion.

2. The scarecrow of claim 1, wherein the head is globe shaped having a bottom opening for passage of the motor assembly.

3. The scarecrow of claim 1, wherein the motion sensor is also configured to sense sound and the electronic controller is operable to record sound in response to sound being sensed.

4. The scarecrow of claim 1, wherein the scarecrow is configured to resemble an owl.

5. A scarecrow, comprising:
a scarecrow body corresponding generally in shape to a body of a live animal;
a scarecrow head corresponding in shape to a head of the live animal;
a camera having a lens configured as an eye and located at the eye location to appear as an eye of the scarecrow;
a motion sensor associated with the camera to sense motion proximate the scarecrow;
a motor assembly mounted to the scarecrow body and the head and configured to move the head in multiple axis, the motor assembly having:
a swivel motor having a rotatable motor shaft, the swivel motor being received in a swivel motor bracket mounted to an upper surface of the scarecrow body, with a swivel motor bracket cover overlying the swivel motor bracket and including an aperture for passage of the rotatable motor shaft of the swivel motor,
a tilt motor having a rotatable motor shaft and received by a tilt motor bracket, with a tilt motor bracket cover, the tilt motor cover having an upstanding portion adjacent the tilt motor bracket and a base portion overlying the swivel motor bracket cover, the upstanding portion having an aperture for passage of the rotatable motor shaft of the tilt motor and the base portion having a slot to receive the rotatable motor shaft of the swivel motor such that the tilt motor cover rotates in response to rotation of the rotatable motor shaft of the swivel motor, and
a head connector bracket overlying the upstanding portion and having a slot located to overlie the aperture of the upstanding portion and receive the rotatable motor shaft of the tilt motor such that the head connector bracket rotates relative to the upstanding portion in response to rotation of the rotatable motor shaft of the tilt motor, the head connector bracket being connected to an underside of the rear head portion; and
an electronic controller mounted within the head and in electrical communication with the swivel motor, the tilt motor, the camera, and the motion sensor;
wherein in response to motion exterior of the scarecrow being sensed by the motion sensor the electronic controller activates the camera and operates the swivel motor or tilt motor or both as needed to swivel or tilt or both the head so that the head moves and the camera follows the motion and records images of the motion.

6. The scarecrow of claim 5, wherein the head is a two-piece head.

7. A motion following camera, comprising:
a head;
a camera mounted on the head;
a motion sensor associated with the camera to sense motion proximate the head;
a motor assembly mounted to a support proximate the head and configured to move the head in multiple axis relative to the support, the motor assembly having:
a swivel motor having a rotatable motor shaft, the swivel motor being received in a swivel motor bracket mounted to the support, with a swivel motor bracket cover overlying the swivel motor bracket and including an aperture for passage of the rotatable motor shaft of the swivel motor;
a tilt motor having a rotatable motor shaft and received by a tilt motor bracket, with a tilt motor bracket cover, the tilt motor cover having an upstanding portion adjacent the tilt motor bracket and a base portion overlying the swivel motor bracket cover, the upstanding portion having an aperture for passage of the rotatable motor shaft of the tilt motor and the base portion having a slot to receive the rotatable motor shaft of the swivel motor such that the tilt motor cover rotates in response to rotation of the rotatable motor shaft of the swivel motor;
a head connector bracket overlying the upstanding portion and having a slot located to overlie the aperture of the upstanding portion and receive the rotatable motor shaft of the tilt motor such that the head connector bracket rotates relative to the upstanding portion in response to rotation of the rotatable motor shaft of the tilt motor, the head connector bracket being connected to an underside of the head; and
an electronic controller mounted within the head and in electrical communication with the swivel motor, the tilt motor, the camera, and the motion sensor;
wherein in response to motion exterior of the head being sensed by the motion sensor the electronic controller activates the camera and operates the swivel motor or tilt motor or both as needed to swivel or tilt or both the head so that the head moves and the camera follows the motion and records images of the motion.

* * * * *